United States Patent Office 3,437,297
Patented Apr. 8, 1969

3,437,297
SUPPORT MEMBERS FOR PIPES
Karl Jirka, Munich, and Johann Gütlhuber, Hohlweg, Germany, assignors to Kunststoffwerk Gebruder Anger G.m.b.H. & Co., Munich, Germany
Filed Sept. 8, 1966, Ser. No. 578,044
Claims priority, application Germany, Sept. 14, 1965, K 57,160
Int. Cl. F16l 3/22
U.S. Cl. 248—68                                   7 Claims

ABSTRACT OF THE DISCLOSURE

At least one plate provided with a peripheral recess in the shape of a part of a circle greater than 180° by an amount sufficient to retain a pipe in said recess and by an amount whereby said pipe, on being temporarily elastically deformed, can be laterally inserted into the said recess, and flanges perpendicularly extending from each said plate and bounding the recesses.

---

The invention relates to support members for pipes that are to be laid in bundles, and more particularly to plastic pipes.

Conventionally, pipes are laid either singly or in integral assemblies according to the contemplated field of application. In the latter case, these are usually block conduits made of concrete for cables or, in special cases, they may be steel cable conduits used, for instance, for road, embankment or river crossings.

In the case of block conduits for cables, the association of several conduits is usually achieved by using multiple conduit blocks which may be laid individually or in association, one above or alongside the other according to the number of cables involved. The accuracy required in laying is thus assured both along the length of a line section and at shaft entries and exits.

This advantage does not similarly apply to plastic pipes that are to be laid in association. Apart from the necessary relative location of the pipes, means must also be provided, particularly where the pipes may be subjected to heavy loads due to traffic, which permit them to be laid with due regard to the elasticity of the material within the limits imposed by their maximum permissible deformation so that the pipes are completely embedded in packing material. Point or line contact between neighboring pipes is preferably completely avoided.

Another requirement is that, during subsequent excavations near the pipe lines, the pipes should retain their stability within the pipe assembly. When the pipe assembly is deprived of lateral support the weight of the overlying depth of soil which may have been augmented by the weight of additional soil thrown up on the surface should not be able to dislocate the pipes in the sideways direction.

An object of the present invention is the provision, for pipes that are to be laid in bundles, of a support member which permits a plurality of pipes to be held together in the form of a bundle which satisfies the above-mentioned requirements, and which also permits existing bundles of pipes to be subsequently enlarged by the addition of further pipes without impairing the bundled structure of the assembly.

The support member according to the invention consists of a plate provided with two or more circularly arcuate open recesses cut into the edge of the plate, each adapted to embrace slightly more than half the circumference of a pipe so that the pipes can be forced into said recesses by being briefly elastically pinched together during insertion, each recess being provided with a flange which likewise embraces the pipe.

Support members of the proposed kind permit any number of pipes to be associated in a bundle of uniform structure. The presence of the flanges locates the plate in a plane normal to the pipe axes. Assuming that support members provided with two such recesses are used, then the structure of the bundle that will then usually be formed is one in which each pipe is surrounded at equal distances therefrom by four pipes to each of which it is connected by a support member.

If the support member is provided with three recesses (assumed to be equidistantly spaced), then each pipe will be connected by two support members to six neighboring pipes surrounding the same at equal distances. However, preference is given to the forms of construction containing two or four recesses.

As between these latter types, the preferred choice is the embodiment containing four recesses. The best disposition of these four recesses is such that their centers define the corners of a square, since the resultant pipe arrangement will then be completely symmetrical.

In this latter case, the support member itself may be symmetrical, i.e. it may have the form of a cross having contours formed by circular arcs with the exception of the ends of the arms of the cross. However, the preferred embodiment is one having the form of a rectangle with two circularly arcuate recesses embracing slightly more than a semicircle cut into each of its longer sides.

Conveniently the support member may be made of a plastic material. The flange on each recess preferably projects to only one side of the plate.

Several embodiments of the invention will be hereunder described by reference to the accompanying drawings, in which.

Figure 1:
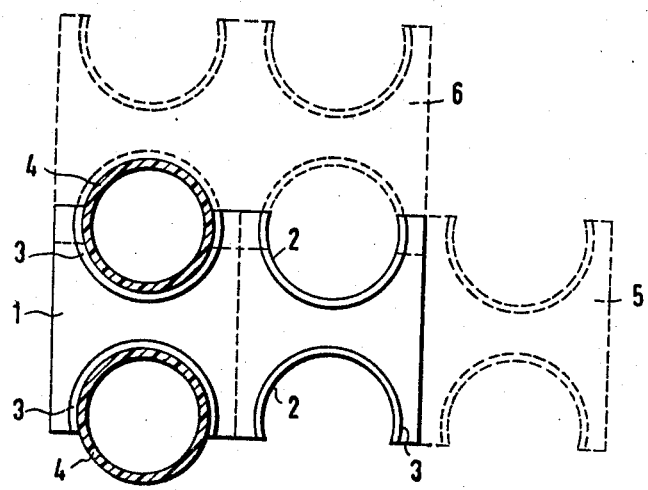
FIGURES 1 and 2 illustrate the preferred construction of a support member, according to the invention, seen respectively in plan and from the side, two pipes being shown and two further support members being indicated in dashed lines.

The support member 1 according to FIGURE 1 is a double H-shaped generally rectangular plastic plate formed with four peripheral recesses 2 of circularly arcuate shape embracing slightly more than 180 degrees or a semicircle. Each recess is surrounded or bordered by a flange 3 which projects perpendicularly from one side of the plane defined by the plate. Plastic pipes 4 have been laterally inserted into the two recesses on the left by slightly pinching the pipes together during insertion. The distances *a* and *b* are equal. The centers of the circular arcs define the corners of a square.

Figure 2:
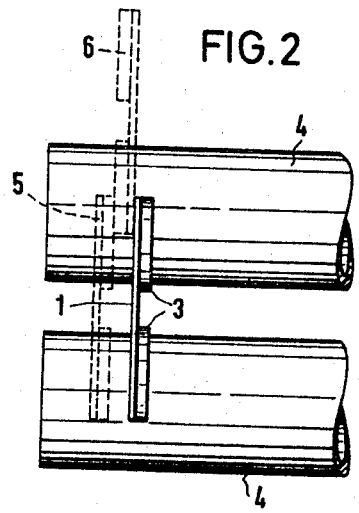

If more than two pipes are to be laid on the right of these first two pipes a second member 5 which is indicated in dashed outline is placed as shown in the drawing so that it overlaps one half of the first member. Four more pipes can then be inserted into the available recesses at the top and at the bottom. If a third support member 6 is needed above this assembly, member 5 is preferably spaced away from member 1 in the axial direction of the pipes as shown in FIGURE 2. In the manner shown in the drawing, member 6 can then be clipped over the upper pipes that have already been inserted into member 1 and additional pipes fitted into the recesses at the top of member 6. The described procedure permits a bundle of any number of pipes to be firmly clipped together. If the bundle of pipes has been assembled and further pipes are to be subsequently added, say on the left in FIGURE 1, then additional support members can be pushed horizontally between the pipes and tilted into the position shown in FIGURE 1.

Figure 3:
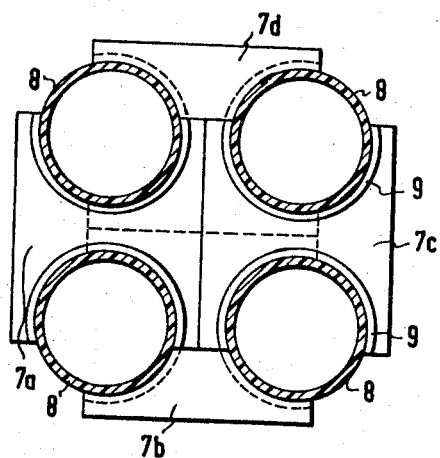
FIGURES 3 and 4 show four support members in a different embodiment with pipes inserted, seen in plan and from the side.
Figure 4:
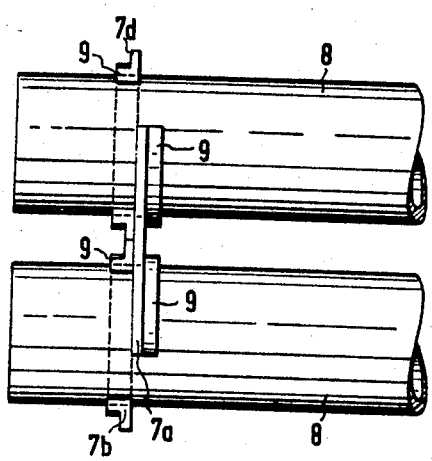

The H-shaped support member illustrated in FIGURES 3 and 4 has only two recesses in its ends for the reception of pipes. The drawings show four support members 7a, 7b, 7c, 7d fitted together to combine four pipes 8 in an assembly with selected of the recesses in concentric relation. Rigidity is imparted to such an arrangement because the longer sides of the support members 7a and 7c as well as of 7b and 7d are in abutting contact. In this embodiment each recess is likewise formed with a flange 9 which projects from one side of the plate. This form of construction is more convenient than that shown in FIGURES 5 and 6.

Figure 5:
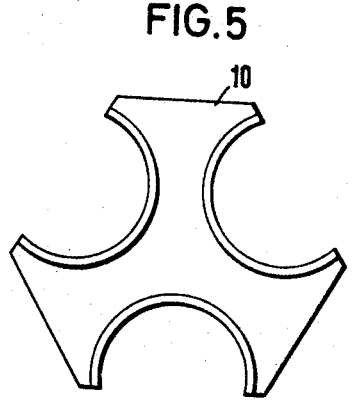
FIGURES 5 and 6 are a plan and side view of a third embodiment of a support member.
Figure 6:

The polygonal configuration of the support member 10 in FIGURES 5 and 6 is based upon the same principle of construction as that of the previously described embodiments, but it is triangular and comprises only three recesses at its three apices.

Figure 7:
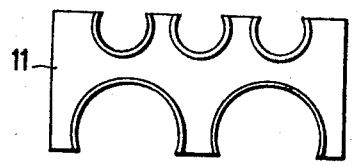
FIGURES 7 and 8 are a plan and side view of a fourth embodiment of a support member.
Figure 8:

The further support member in FIGURES 7 and 8 differs from that in FIGURES 1 and 2 in that it is suitable for clipping together pipes of different diameters. Assembly and application are otherwise substantially the same as in the case of the support member illustrated in FIGURES 1 and 2.

In the above embodiments, the plates will preferably be of a thermoplastic resin such as polyvinylchloride preferably unplasticized or acrylonitrilebutadiene styrene or polyethylene. The pipes are also preferably of such materials. Pipes of one to ten inch diameters and beyond are readily accommodate by plates of the invention. Said plates are preferably of a thickness which is 2-3% of the pipe diameter although this relationship can be exceeded whenever convenient. Similarly, the flange height runs preferably to about 15-20% of the pipe diameter.

In respect of the angular extent of the recesses, it will be appreciated that any angle over 180° but less than 360° will accommodate some form of pipe in accordance with the invention. However, as a practical matter, pipes of the type of material indicated above are best accommodated within a circle of about 220–230 degrees.

What is claimed is:
1. Apparatus comprising at least one plate of plastic material provided with at least two peripheral recesses, each in the shape of a part of a circle with an angle between 220° and 230° to retain a pipe of the same diameter in said recess and to permit said pipe to be laterally inserted into the same recess under temporarily elastic deformation, each said plate comprising flanges extending perpendicularly from each said plate on only one side thereof bounding said recesses, each said plate having two ends and parallel straight side edges connecting said ends, one said recess being located in said end so that said plate has a generally H-shape.

2. Apparatus as claimed in claim 1 comprising at least two such plates in spaced parallel relation with at least one recess on one plate in concentric relation with a recess on another plate.

3. Apparatus as claimed in claim 1, wherein the recesses on one plate are of the same diameter.

4. Apparatus as claimed in claim 1, wherein the recesses on one plate are of different diameters.

5. Apparatus as claimed in claim 1, wherein two said recesses are located in each end so that said plate has generally a double H-shape.

6. Apparatus as claimed in claim 1, wherein each flange has a height of about 15–20% of the diameter of the associated pipe.

7. Apparatus as claimed in claim 1, wherein each plate has a thickness of about 2–3% of the diameter of the associated pipe.

References Cited
UNITED STATES PATENTS

| | | | |
|---|---|---|---|
| 1,801,451 | 4/1931 | Parker | 138—77 |
| 2,997,265 | 8/1961 | Weiss | 248—68 |
| 2,997,531 | 8/1961 | Oldham et al. | 248—68 X |
| 3,338,538 | 8/1967 | Roche | 248—75 |

ROY D. FRAZIER, *Primary Examiner.*

J. F. FOSS, *Assistant Examiner.*

U.S. Cl. X.R.

138—77